US009955413B2

United States Patent
Tan et al.

(10) Patent No.: US 9,955,413 B2
(45) Date of Patent: Apr. 24, 2018

(54) ROAMING NETWORK ACCESS METHOD AND APPARATUS

(71) Applicant: Huawei Device Co., Ltd., Shenzhen (CN)

(72) Inventors: Guanzhong Tan, Shenzhen (CN); Shujun Dang, Beijing (CN); Songping Yao, Beijing (CN); Hui Jin, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days.

(21) Appl. No.: 15/129,796

(22) PCT Filed: Mar. 28, 2014

(86) PCT No.: PCT/CN2014/074271
§ 371 (c)(1),
(2) Date: Sep. 27, 2016

(87) PCT Pub. No.: WO2015/143703
PCT Pub. Date: Oct. 1, 2015

(65) Prior Publication Data
US 2017/0223621 A1    Aug. 3, 2017

(51) Int. Cl.
*H04W 4/00* (2009.01)
*H04W 48/18* (2009.01)
(Continued)

(52) U.S. Cl.
CPC ............ *H04W 48/18* (2013.01); *H04W 8/02* (2013.01); *H04W 60/00* (2013.01)

(58) Field of Classification Search
CPC ........ H04W 48/18; H04W 8/02; H04W 60/00
(Continued)

(56) References Cited

U.S. PATENT DOCUMENTS 6,085,085 A * 7/2000 Blakeney, II ......... H04W 8/183
455/426.1
6,311,064 B1 * 10/2001 Bamburak ............ H04W 48/18
455/434
(Continued)

FOREIGN PATENT DOCUMENTS

CN     101600240 A     12/2009
CN     101951586 A      1/2011
(Continued)

OTHER PUBLICATIONS

"3rd Generation Partnership Project; Technical Specification Group Core Network and Terminals; Mobile radio interface Layer 3 specification; Core network protocols; Stage 3 (Release 12)", 3GPP TS 24.008 V12.5.0, Mar. 2014, 664 pages.

*Primary Examiner* — William Nealon

(57) ABSTRACT

Embodiments of the present invention provide a roaming network access method and apparatus, where the method includes: searching, by user equipment, for at least one available network in a roaming area; acquiring, by the user equipment, historical roaming information, where the historical roaming information is used to record information about a network to which a registration attempt has been made when a user roams; adjusting, by the user equipment, a priority of the at least one found available network according to the historical roaming information; and successively selecting, by the user equipment in descending order of an adjusted priority of the at least one found available network, the at least one found available network as a registration attempt network, and attempting to register with the registration attempt network.

24 Claims, 4 Drawing Sheets

(51) Int. Cl.
*H04W 8/02* (2009.01)
*H04W 60/00* (2009.01)

(58) Field of Classification Search
USPC .................................................. 455/432.1
See application file for complete search history.

(56) References Cited

U.S. PATENT DOCUMENTS

| | | | |
|---|---|---|---|
| 7,480,507 B2 | 1/2009 | Kuroda | |
| 8,463,269 B2* | 6/2013 | Mubarek | H04W 48/18 370/328 |
| 2003/0134637 A1* | 7/2003 | Cooper | H04W 48/18 455/432.1 |
| 2004/0203745 A1 | 10/2004 | Cooper | |
| 2010/0216465 A1 | 8/2010 | Mubarek et al. | |
| 2010/0234021 A1* | 9/2010 | Ngai | H04W 36/385 455/433 |
| 2011/0021195 A1 | 1/2011 | Cormier et al. | |
| 2012/0052911 A1* | 3/2012 | Chin | H04W 4/003 455/558 |
| 2012/0269163 A1* | 10/2012 | Edara | H04W 24/00 370/331 |

FOREIGN PATENT DOCUMENTS

| | | |
|---|---|---|
| CN | 102149068 A | 8/2011 |
| CN | 102349334 A | 2/2012 |
| CN | 103095383 A | 5/2013 |
| CN | 103109569 A | 5/2013 |
| EP | 2282586 A1 | 2/2011 |
| JP | 2006504291 A | 2/2006 |
| WO | 03/067918 A1 | 8/2003 |

* cited by examiner

ROAMING NETWORK ACCESS METHOD AND APPARATUS

CROSS REFERENCE TO RELATED APPLICATIONS

The present application claims priority under 35 U.S.C. § 365 to International Patent Application No. PCT/CN2014/074271 filed Mar. 28, 2014, which is incorporated herein by reference into the present disclosure as if fully set forth herein.

TECHNICAL FIELD

Embodiments of the present invention relate to communications technologies, and in particular, to a roaming network access method and apparatus.

BACKGROUND

When user equipment (User Equipment, UE for short) is powered on or roams, a top priority is to select a public land mobile network (Public Land Mobile Network, PLMN for short) and successfully register with the public land mobile network. Only in this way, the UE can obtain a communication service, such as a call, and data transmission. After the UE is powered on, the UE first attempts to register with a public land mobile network successfully and previously registered (Registered PLMN, RPLMN for short) by the UE. If the registration fails, the UE proceeds with PLMN search and PLMN selection processes, where in the PLMN search process, the UE searches for an available network according to a frequency band and a radio access technology (Radio Access Technologies, RAT for short) that are supported by the UE, and then forms an available network list. Each element in the list includes a PLMN and a RAT of an available network.

In the PLMN selection process, to help the UE register with an available network more quickly, the UE selects a PLMN according to a particular rule. It is defined in a 3GPP protocol that the UE selects a PLMN according to the following sequence: a home public land mobile network (Home PLMN, HPLMN for short)→a user controlled public land mobile network (User PLMN, UPLMN for short)→an operator controlled public land mobile network (Operator PLMN, OPLMN for short)→other available PLMNs (OTHER Available PLMN). For example, the UE sets priorities for available networks in a found available network list according to signal quality of the HPLMN, UPLMN, OPLMN, and the other available PLMNs, and sorts the available networks in descending order of the priorities. The UE successively selects, in descending order of the priorities, the available networks to attempt to register with until the registration is successful.

For each selected available network, a registration process performed by the UE may involve multiple rounds of signaling message exchange in an entire network. In addition, when a registration attempt fails, the UE further needs to continue to attempt to register with a same available network until a preset stop condition is met, for example, registration attempts reach a preset threshold of failed registration attempts. Therefore, a delay for attempting to register with an available network by the UE is relatively large. In addition, in a roaming scenario of the UE, if there are a large quantity of operators in a roaming area of the UE, the available network list may be long, for example, in Hong Kong, the United States, and some European countries, there are many small operators, and there may be up to dozens of elements (PLMN, RAT) in the available network list.

In the prior art, when initially accessing a network from a roaming area, UE can successfully register with a network in the roaming area after a relatively long time, which affects user experience.

SUMMARY

Embodiments of the present invention provide a roaming network access method and apparatus, which reduce a time for initially accessing a network from a roaming area by user equipment.

According to a first aspect, an embodiment of the present invention provides a roaming network access method, where the method includes:

searching, by user equipment, for at least one available network in a roaming area;

acquiring, by the user equipment, historical roaming information, where the historical roaming information is used to record information about a network to which a registration attempt has been made when a user roams;

adjusting, by the user equipment, a priority of the at least one found available network according to the historical roaming information; and successively selecting, by the user equipment in descending order of an adjusted priority of the at least one found available network, the at least one found available network as a registration attempt network, and attempting to register with the registration attempt network.

According to the first aspect, in a first possible implementation manner of the first aspect, the historical roaming information includes: a first roaming network list, where the first roaming network list is used to record information about a successfully registered network when the user roams; and the adjusting, by the user equipment, a priority of the at least one found available network according to the historical roaming information includes: determining, by the user equipment, whether the at least one found available network is recorded in the first roaming network list; and if the at least one found available network is recorded in the first roaming network list, retaining or increasing the priority of the at least one found available network.

According to the first possible implementation manner of the first aspect, in a second possible implementation manner of the first aspect, after the attempting to register with the registration attempt network, the method further includes: determining, by the user equipment, whether the registration is successful; and if it is determined that the user equipment is not successfully registered with the registration attempt network, determining, by the user equipment, whether the registration attempt network is recorded in the first roaming network list, and when it is determined that the registration attempt network is recorded in the first roaming network list, deleting a record of the registration attempt network from the first roaming network list; or if it is determined that the user equipment is successfully registered with the registration attempt network, determining, by the user equipment, whether the registration attempt network is recorded in the first roaming network list, and when it is determined that the registration attempt network is not recorded in the first roaming network list, adding a record of the registration attempt network to the first roaming network list.

According to the first aspect, and either of the first and the second possible implementation manners of the first aspect, in a third possible implementation manner of the first aspect, the historical roaming information includes: a second roaming network list, where the second roaming network list is used to record information about an unsuccessfully registered network when the user roams; and the adjusting, by the user equipment, a priority of the at least one found available network according to the historical roaming information includes: setting, by the user equipment, a priority of a network that is in the at least one found available network and is recorded in the second roaming network list to be lower than a priority of a network not recorded in the second roaming network list.

According to the third possible implementation manner of the first aspect, in a fourth possible implementation manner of the first aspect, after the attempting to register with the registration attempt network, the method further includes: determining, by the user equipment, whether the registration is successful; and if it is determined that the user equipment is not successfully registered with the registration attempt network, determining, by the user equipment, whether the registration attempt network is recorded in the second roaming network list, and when it is determined that the registration attempt network is not recorded in the second roaming network list, adding a record of the registration attempt network to the second roaming network list; or if it is determined that the user equipment is successfully registered with the registration attempt network, determining, by the user equipment, whether the registration attempt network is recorded in the second roaming network list, and when it is determined that the registration attempt network is recorded in the second roaming network list, deleting a record of the registration attempt network from the second roaming network list.

According to the first aspect, or any one of the first to the fourth possible implementation manners of the first aspect, in a fifth possible implementation manner of the first aspect, the historical roaming information is stored in a non-volatile memory of the user equipment.

According to the fifth possible implementation manner of the first aspect, in a sixth possible implementation manner of the first aspect, a backup of the historical roaming information is stored in cloud; and the acquiring, by the user equipment, historical roaming information includes: detecting, by the user equipment, whether the historical roaming information is stored in the non-volatile memory of the user equipment; and if the historical roaming information is not stored in the non-volatile memory of the user equipment, acquiring, by the user equipment, the historical roaming information stored in the cloud; or if the historical roaming information is stored in the non-volatile memory of the user equipment, synchronizing, by the user equipment, the historical roaming information to the cloud.

According to the sixth possible implementation manner of the first aspect, in a seventh possible implementation manner of the first aspect, the method further includes:

after the historical roaming information is updated, synchronizing, by the user equipment, the historical roaming information to the cloud.

According to the first aspect, or any one of the first to the fourth possible implementation manners of the first aspect, in an eighth possible implementation manner of the first aspect, the historical roaming information is stored in a subscriber identity module.

According to the eighth possible implementation manner of the first aspect, in a ninth possible implementation manner of the first aspect, that the historical roaming information is stored in a subscriber identity module is specifically: the historical roaming information is stored in a historical roaming information elementary file (EF) in the subscriber identity module.

According to the ninth possible implementation manner of the first aspect, in a tenth possible implementation manner of the first aspect, the historical roaming information EF includes a valid time; and the method further includes: when the valid time expires, deleting the historical roaming information from the historical roaming information EF.

According to a second aspect, an embodiment of the present invention provides a roaming network access apparatus, where the apparatus includes:

a searching module, configured to search for at least one available network in a roaming area;

an acquiring module, configured to acquire historical roaming information, where the historical roaming information is used to record information about a network to which a registration attempt has been made when a user roams;

an adjusting module, configured to adjust, according to the historical roaming information acquired by the acquiring module, a priority of the available network found by the searching module; and a registration module, configured to: successively select, in descending order of a priority that is of the at least one found available network and is adjusted by the adjusting module, the at least one found available network as a registration attempt network, and attempt to register with the registration attempt network.

According to the second aspect, in a first possible implementation manner of the second aspect, the historical roaming information includes: a first roaming network list, where the first roaming network list is used to record information about a successfully registered network when the user roams; and the adjusting module is specifically configured to: determine whether the at least one found available network is recorded in the first roaming network list; and if the at least one found available network is recorded in the first roaming network list, retain or increase the priority of the at least one found available network.

According to the first possible implementation manner of the second aspect, in a second possible implementation manner of the second aspect, the registration module is further configured to: after the attempt to register with the registration attempt network is made, determine whether the registration is successful; and if it is determined that the user equipment is not successfully registered with the registration attempt network, determine whether the registration attempt network is recorded in the first roaming network list, and when it is determined that the registration attempt network is recorded in the first roaming network list, delete a record of the registration attempt network from the first roaming network list; or if it is determined that the user equipment is successfully registered with the registration attempt network, determine whether the registration attempt network is recorded in the first roaming network list, and when it is determined that the registration attempt network is not recorded in the first roaming network list, add a record of the registration attempt network to the first roaming network list.

According to the second aspect, or either one of the first and the second possible implementation manners of the second aspect, in a third possible implementation manner of the second aspect, the historical roaming information includes: a second roaming network list, where the second roaming network list is used to record information about an unsuccessfully registered network when the user roams; and the adjusting module is specifically configured to set a priority of a network that is in the at least one found available network and is recorded in the second roaming network list to be lower than a priority of a network not recorded in the second roaming network list.

According to the third possible implementation manner of the second aspect, in a fourth possible implementation manner of the second aspect, the registration module is further configured to: after the attempt to register with the registration attempt network is made, determine whether the registration is successful; and if it is determined that the user equipment is not successfully registered with the registration attempt network, determine whether the registration attempt network is recorded in the second roaming network list, and when it is determined that the registration attempt network is not recorded in the second roaming network list, add a record of the registration attempt network to the second roaming network list; or if it is determined that the user equipment is successfully registered with the registration attempt network, determine whether the registration attempt network is recorded in the second roaming network list, and when it is determined that the registration attempt network is recorded in the second roaming network list, delete a record of the registration attempt network from the second roaming network list.

According to the second aspect, or any one of the first to the fourth possible implementation manners of the second aspect, in a fifth possible implementation manner of the second aspect, the historical roaming information is stored in a non-volatile memory of the user equipment.

According to the fifth possible implementation manner of the second aspect, in a sixth possible implementation manner of the second aspect, a backup of the historical roaming information is stored in cloud; and the acquiring module is specifically configured to: detect whether the historical roaming information is stored in the non-volatile memory of the user equipment; and if the historical roaming information is not stored in the non-volatile memory of the user equipment, acquire the historical roaming information stored in the cloud; or if the historical roaming information is stored in the non-volatile memory of the user equipment, synchronize the historical roaming information to the cloud.

According to the sixth possible implementation manner of the second aspect, in a seventh possible implementation manner of the second aspect, the acquiring module is further configured to: after the historical roaming information is updated, synchronize the historical roaming information to the cloud.

According to the second aspect, or any one of the first to the fourth possible implementation manners of the second aspect, in an eighth possible implementation manner of the second aspect, the historical roaming information is stored in a subscriber identity module.

According to the eighth possible implementation manner of the second aspect, in a ninth possible implementation manner of the second aspect, that the historical roaming information is stored in a subscriber identity module is specifically: the historical roaming information is stored in a historical roaming information elementary file (EF) in the subscriber identity module.

According to the ninth possible implementation manner of the second aspect, in a tenth possible implementation manner of the second aspect, the historical roaming information EF includes a valid time; and the registration module is further configured to: when the valid time expires, delete the historical roaming information from the historical roaming information EF.

In the used roaming network access method and apparatus in this embodiment of the present invention, when user equipment of a user initially accesses a network from a roaming area, information about a network to which a registration attempt has been made when the user roams in history is comprehensively considered when the user equipment sets a priority for each found available network, so that an available network with which the user can successfully register has a relatively high priority and is preferentially attempted for registration by the user equipment, thereby shortening a time for initially accessing a network from a roaming area by the user equipment, and improving user experience.

DETAILED DESCRIPTION

Figure 1:
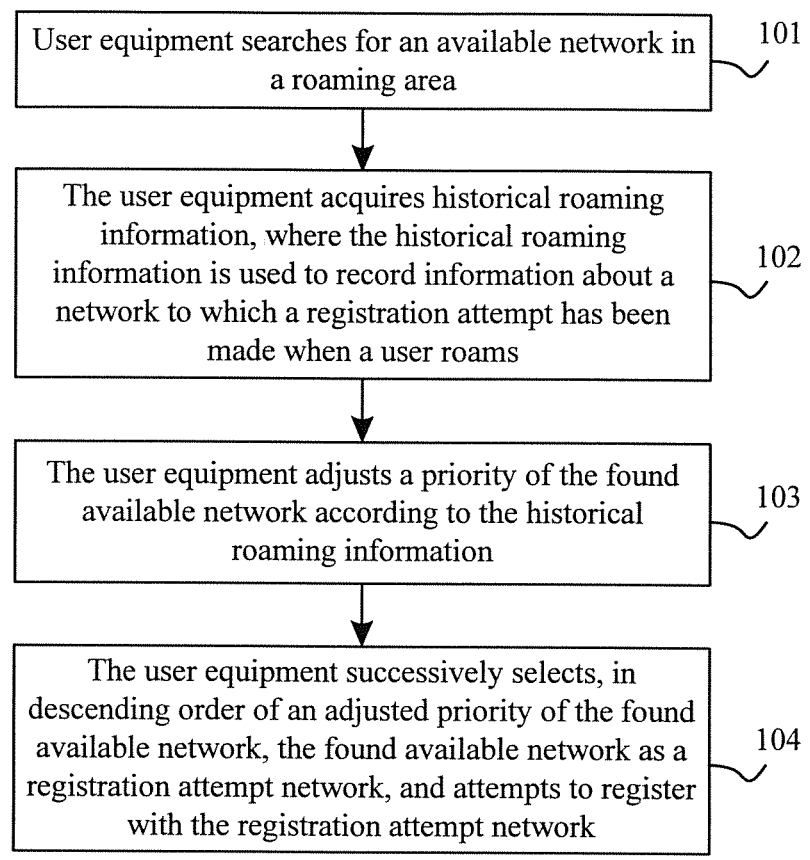
FIG. 1 is a flowchart of a roaming network access method according to an embodiment of the present invention.

FIG. 1 is a flowchart of a roaming network access method according to an embodiment of the present invention. As shown in FIG. 1, the method includes the following steps:

101. User equipment searches for at least one available network in a roaming area.

102. The user equipment acquires historical roaming information, where the historical roaming information is used to record information about a network to which a registration attempt has been made when a user roams.

There is no strict time sequence between step 101 and step 102. Step 101 may be performed before step 102, or may be performed after step 102, or step 101 and step 102 may be performed at the same time.

The user equipment may acquire the list from a local storage unit, or may acquire the list from another device or network.

103. The user equipment adjusts a priority of the at least one found available network according to the historical roaming information.

104. The user equipment successively selects, in descending order of an adjusted priority of the at least one found available network, the at least one found available network as a registration attempt network, and attempts to register with the registration attempt network.

Optionally, the historical roaming information is stored in a subscriber identity module (SIM) and/or a non-volatile memory (non-volatile memory) of the user equipment.

Specifically, the roaming network access method provided in this embodiment of the present invention can be applied to a scenario in which user equipment of a user initially accesses a network from roaming in a roaming area. The user equipment may be a wireless communications device, such as a cellular phone (cellular phone), and a tablet computer. The information about the network includes a PLMN and/or a RAT.

In the used roaming network access method provided in this embodiment of the present invention, when the user equipment initially accesses a network from a roaming area, if it is determined that the user equipment is in a roaming state, information about a network to which a registration attempt has been made when the user roams in history is comprehensively considered when the user equipment sets a priority for each found available network, so that an available network with which the user can successfully register has a relatively high priority and is preferentially attempted for registration by the user equipment, thereby shortening a time for initially accessing a network from a roaming area by the user equipment, and improving user experience.

Optionally, based on the roaming network access method provided in this embodiment of the present invention, a feasible implementation manner of storing the historical roaming information in the subscriber identity module is adding a new elementary file (Elementary File, EF for short) to the SIM: a historical roaming information elementary file (EF-Roam), where the EF-Roam is used to store historical roaming information of a user.

When the user equipment initially accesses a network from roaming in a roaming area:

After receiving a registration success or location update success message, the user equipment stores, in the EF-Roam, information about an available network that the user equipment is currently and successfully registered with.

When a registration request of the user equipment is rejected, for example, a reason for rejection is that a PLMN is not available (PLMN not allowed), the user equipment determines whether an available network that the user equipment currently fails to be registered with is recorded in the EF-Roam; and if the available network that the user equipment currently fails to be registered with is recorded in the EF-Roam, deletes, from the EF-Roam, the available network that the user equipment currently fails to be registered with.

Optionally, a valid time field is set in the EF-Roam. When the valid time expires, the historical roaming information is deleted from the EF-Roam. Alternatively, a valid time starts to be measured at the same time when information about an available network is added to the EF-Roam; when the valid time expires, the information about the available network is automatically deleted from the EF-Roam.

Optionally, based on the roaming network access method provided in this embodiment of the present invention, the historical roaming information includes: a first roaming network list, where the first roaming network list is used to record information about a successfully registered network when the user roams.

The adjusting, by the user equipment, a priority of the at least one found available network according to the historical roaming information includes: determining, by the user equipment, whether the at least one found available network is recorded in the first roaming network list; and if the at least one found available network is recorded in the first roaming network list, retaining or increasing the priority of the at least one found available network. For example, the user equipment may retain or increase a priority of a network that is in the at least one found available network and is recorded in the first roaming network list, so that the priority of the network that is in the at least one found available network and the user equipment is successfully registered with when the user roams in history is not lower than a priority of a network not recorded in the first roaming network list, and the network that is in the at least one found available network and is recorded in the first roaming network list can be preferentially attempted for registration by the user equipment, thereby shortening a time for initially accessing a network from a roaming area by the user equipment, and improving user experience.

Further, the user equipment may update the first roaming network list in real time according to a registration attempt result.

Figure 2:
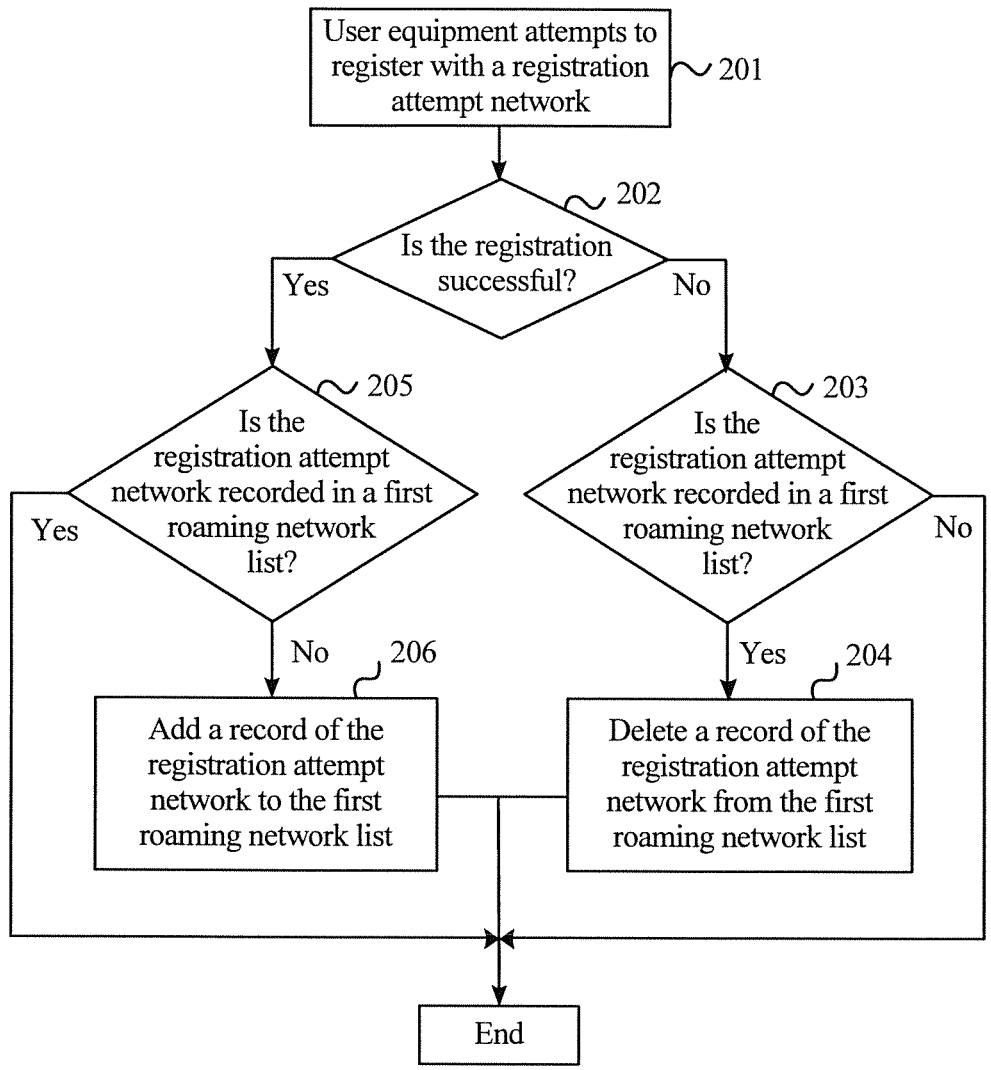
FIG. 2 is a flowchart of updating a first roaming network list according to an embodiment of the present invention.

FIG. 2 is a flowchart of updating a first roaming network list according to an embodiment of the present invention. This embodiment of the present invention is implemented based on the method embodiment shown in FIG. 1. Further, a method in this embodiment of the present invention further describes how to update historical roaming information of a user. As shown in FIG. 2, the method includes the following steps:

201. The user equipment attempts to register with a registration attempt network when initially accessing a network from roaming in a roaming area.

202. The user equipment determines whether the registration is successful; if it is determined that the user equipment is not successfully registered with the registration attempt network, go to step 203; or if it is determined that the user equipment is successfully registered with the registration attempt network, go to step 205.

203. The user equipment determines whether the registration attempt network is recorded in the first roaming network list; if the registration attempt network is recorded in the first roaming network list, go to step 204; or if the registration attempt network is not recorded in the first roaming network list, the update procedure ends.

204. Delete a record of the registration attempt network from the first roaming network list, and the update procedure ends.

205. The user equipment determines whether the registration attempt network is recorded in the first roaming network list; if the registration attempt network is not recorded in the first roaming network list, go to step 206; or if the registration attempt network is recorded in the first roaming network list, the update procedure ends.

206. Add a record of the registration attempt network to the first roaming network list, and the update procedure ends.

Optionally, based on the roaming network access method provided in this embodiment of the present invention, the historical roaming information includes: a second roaming network list, where the second roaming network list is used to record information about an unsuccessfully registered network when the user roams.

The adjusting, by the user equipment, a priority of the at least one found available network according to the historical roaming information includes: setting, by the user equipment, a priority of a network that is in the at least one found available network and is recorded in the second roaming network list to be lower than a priority of a network not recorded in the second roaming network list, so that a priority of a network that is in the at least one found available network and the user equipment fails to be registered with when the user roams in the history is lower than the priority of the network not recorded in the second roaming network list, which avoids a meaningless waiting time that is occupied due to preferentially attempting to register with a network in the second roaming network list, thereby shortening a time for initially accessing a network from a roaming area by the user equipment, and improving user experience.

Further, the user equipment may update the second roaming network list in real time according to a registration attempt result.

Figure 3:
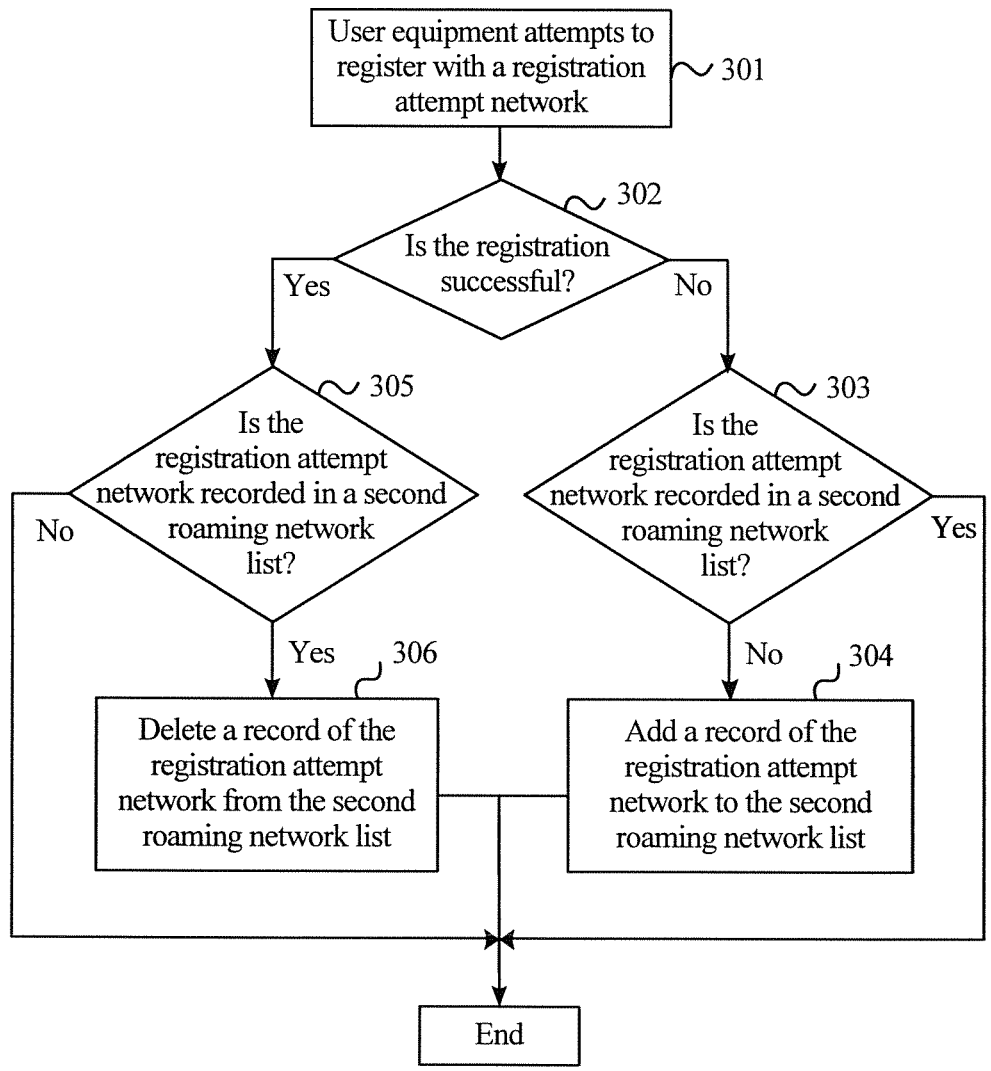
FIG. 3 is a flowchart of updating a second roaming network list according to an embodiment of the present invention.

FIG. 3 is a flowchart of updating a second roaming network list according to an embodiment of the present invention. This embodiment of the present invention is implemented based on the method embodiment shown in FIG. 1. Further, a method in this embodiment of the present invention further describes how to update historical roaming information of a user. As shown in FIG. 3, the method includes the following steps:

301. The user equipment attempts to register with a registration attempt network when initially accessing a network from roaming in a roaming area.

302. The user equipment determines whether the registration is successful; if it is determined that the user equipment is not successfully registered with the registration attempt network, go to step 303; or if it is determined that the user equipment is successfully registered with the registration attempt network, go to step 305.

303. The user equipment determines whether the registration attempt network is recorded in the second roaming network list; if the registration attempt network is not recorded in the second roaming network list, go to step 304; or if the registration attempt network is recorded in the second roaming network list, the update procedure ends.

304. Add a record of the registration attempt network to the second roaming network list, and the update procedure ends.

305. The user equipment determines whether the registration attempt network is recorded in the second roaming network list; if the registration attempt network is recorded in the second roaming network list, go to step 306; or if the registration attempt network is not recorded in the second roaming network list, the update procedure ends.

306. Delete a record of the registration attempt network from the second roaming network list, and the update procedure ends.

Optionally, based on the roaming network access method provided in this embodiment of the present invention, in a scenario in which the user equipment uses a non-volatile memory of the user equipment to store historical roaming information of a user, a backup of the historical roaming information may be stored in cloud. The cloud is used to store historical roaming information of at least one user, and separately store historical roaming information of each user according to an identifier of each user, where the identifier may be information that represents an identity of a user, such as a cloud account or phone number of a user, or an IMEI serial number of user equipment. When the user has lost the user equipment or changed the user equipment, the changed user equipment can acquire historical roaming information of the user from the cloud, and further use the historical roaming information when initially accessing a network from a roaming area, thereby shortening a time for initially accessing the network from the roaming area by the user equipment, and improving user experience.

When the user equipment needs to acquire the historical roaming information, the user equipment first detects whether the historical roaming information is stored in the non-volatile memory of the user equipment.

If the historical roaming information is stored in the non-volatile memory of the user equipment, the user equipment acquires the historical roaming information from the non-volatile memory of the user equipment, and synchronizes the historical roaming information to the cloud, so that version information (such as a synchronization identifier and a timestamp) of the historical roaming information stored in the non-volatile memory of the user equipment is consistent with that of historical roaming information stored in the cloud.

If the historical roaming information is not stored in the non-volatile memory of the user equipment, the user equipment acquires the historical roaming information from the cloud.

Further, after the historical roaming information is changed, the user equipment updates the historical roaming information stored in the non-volatile memory of the user equipment and the version information, synchronizes the historical roaming information to the cloud, and synchronously uploads a change of the historical roaming information to the cloud, so as to update the historical roaming information stored in the cloud and the version information.

Figure 4:
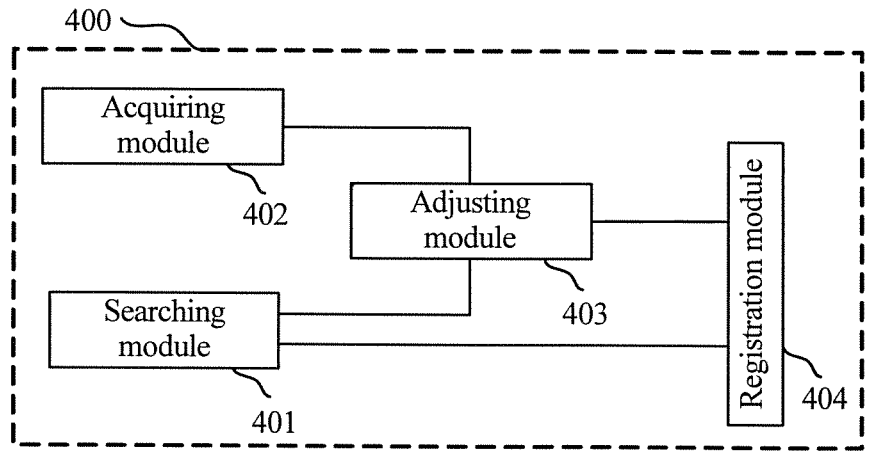
FIG. 4 is a schematic structural diagram of a roaming network access apparatus according to an embodiment of the present invention.

FIG. 4 is a schematic structural diagram of a roaming network access apparatus according to an embodiment of the present invention. As shown in FIG. 4, the roaming network access apparatus 400 provided in this embodiment of the present invention includes:

a searching module 401, configured to search for at least one available network in a roaming area;

an acquiring module 402, configured to acquire historical roaming information, where the historical roaming information is used to record information about a network to which a registration attempt has been made when a user roams;

an adjusting module 403, configured to adjust, according to the historical roaming information acquired by the acquiring module 402, a priority of the available network found by the searching module 401; and a registration module 404, configured to: successively select, in descending order of a priority that is of the at least one found available network and is adjusted by the adjusting module 403, the at least one found available network as a registration attempt network, and attempt to register with the registration attempt network.

The roaming network access apparatus 400 provided in this embodiment of the present invention may be disposed on user equipment. The roaming network access apparatus 400 can be configured to execute the technical solutions in the method embodiment shown in FIG. 1. Implementation principles and technical effects thereof are similar, and details are not described herein again.

Optionally, the historical roaming information includes: a first roaming network list, where the first roaming network list is used to record information about a successfully registered network when the user roams.

The adjusting module 403 is specifically configured to: determine whether the at least one found available network is recorded in the first roaming network list; and if the at least one found available network is recorded in the first roaming network list, retain or increase the priority of the at least one found available network.

Further, the registration module 404 is further configured to: after the attempt to register with the registration attempt network is made, determine whether the registration is successful; and if it is determined that the user equipment is not successfully registered with the registration attempt network, determine whether the registration attempt network is recorded in the first roaming network list, and when it is determined that the registration attempt network is recorded in the first roaming network list, delete a record of the registration attempt network from the first roaming network list; or if it is determined that the user equipment is successfully registered with the registration attempt network, determine whether the registration attempt network is recorded in the first roaming network list, and when it is determined that the registration attempt network is not recorded in the first roaming network list, add a record of the registration attempt network to the first roaming network list.

Optionally, the historical roaming information includes: a second roaming network list, where the second roaming network list is used to record information about an unsuccessfully registered network when the user roams; and the adjusting module 403 is specifically configured to set a priority of a network that is in the at least one found available network and is recorded in the second roaming network list to be lower than a priority of a network not recorded in the second roaming network list.

Further, the registration module 404 is further configured to: after the attempt to register with the registration attempt network is made, determine whether the registration is successful; and if it is determined that the user equipment is not successfully registered with the registration attempt network, determine whether the registration attempt network is recorded in the second roaming network list, and when it is determined that the registration attempt network is not recorded in the second roaming network list, add a record of the registration attempt network to the second roaming network list; or if it is determined that the user equipment is successfully registered with the registration attempt network, determine whether the registration attempt network is recorded in the second roaming network list, and when it is determined that the registration attempt network is recorded in the second roaming network list, delete a record of the registration attempt network from the second roaming network list.

Based on the foregoing embodiment, the historical roaming information is stored in a non-volatile memory of the user equipment.

Further, a backup of the historical roaming information is stored in cloud; and the acquiring module 402 is specifically configured to: detect whether the historical roaming information is stored in the subscriber identity module or in the nonvolatile memory of the user equipment; and if the historical roaming information is not stored in the subscriber identity module or in the nonvolatile memory of the user equipment, acquire the historical roaming information stored in the cloud; or if the historical roaming information is stored in the subscriber identity module or in the nonvolatile memory of the user equipment, synchronize the historical roaming information to the cloud.

Further, the acquiring module 402 is further configured to: after the historical roaming information is updated, synchronize the historical roaming information to the cloud.

Alternatively, based on the foregoing embodiment, the historical roaming information is stored in a subscriber identity module.

Further, that the historical roaming information is stored in a subscriber identity module is specifically: the historical roaming information is stored in a historical roaming information elementary file (EF) in the subscriber identity module.

Further, the historical roaming information EF includes a valid time; and the registration module 404 is further configured to: when the valid time expires, delete the historical roaming information from the historical roaming information EF.

Figure 5:
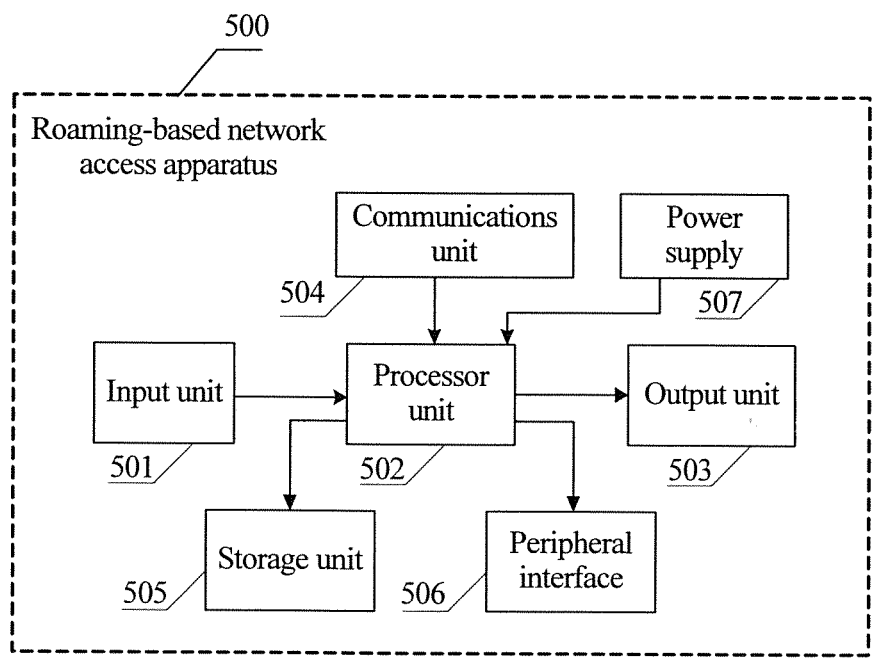
FIG. 5 is another schematic structural diagram of a roaming network access apparatus according to an embodiment of the present invention.

FIG. 5 is another schematic structural diagram of a roaming network access apparatus according to an embodiment of the present invention. As shown in FIG. 5, the roaming network access apparatus 500 provided in this embodiment of the present invention includes components, such as an input unit 501, a processor unit 502, an output unit 503, a communications unit 504, a storage unit 505, a peripheral interface 506, and a power supply 507. These components perform communication by using one or more buses. Persons skilled in the art may understand that a structure of the roaming network access apparatus 500 shown in FIG. 5 does not constitute a limitation on the present invention. The structure may be a bus structure, or may be a star structure, and may further include more or fewer components than those shown in FIG. 5, or combine some parts, or have different parts arrangements. In an implementation manner of the present invention, the roaming network access apparatus 500 may be any mobile or portable communication device, and include but is not limited to a mobile phone, a mobile computer, a tablet computer, a personal digital assistant (Personal Digital Assistant, PDA), a media player, a smart television, and a combination of foregoing two or more items.

The input unit 501 is configured to implement interaction between a user and the roaming network access apparatus 500 and/or information input to the roaming network access apparatus 500. For example, the input unit 501 may receive data or character information input by the user, so as to generate signal input related to user setting or function control. In a specific implementation manner of the present invention, the input unit 501 may be a touch control panel; may be another human-machine interaction interface, such as a substantive input key and a microphone; or may be another external information acquiring apparatus, such as a camera. The touch panel, which is also referred to as a touchscreen or a touchscreen, may collect an operation action of touching or approaching by the user, for example, an operation action performed by the user on the touch panel or at a position close to the touch panel by using any proper object or accessory, such as a finger or a stylus, and a corresponding connecting apparatus is driven according to a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller; the touch controller receives the electrical signal from the touch detection apparatus, converts the electrical signal into touch point coordinates, and then transmits the touch point coordinates to the processor unit 502. The touch controller may further receive and execute a command delivered from the processor unit 502. In addition, the touch panel may be implemented in multiple types, such as a resistive type, a capacitive type, an infrared (Infrared), and a surface acoustic wave. In another implementation manner of the present invention, the substantive input key used by the input unit 501 may include but is not limited to one or more of a physical keyboard, a functional key (such as a volume control key or a power key), a trackball, a mouse, an operating lever, and the like. An input unit in a form of a microphone may collect voice that is input by the user or an environment, and convert the voice into a command that is in a form of an electric signal and may be executed by the processor unit 502.

In other implementation manners of the present invention, the input unit 501 may further be various types of sensing components, such as Hall component that is configured to: detect a physical quantity of the roaming network access apparatus 500, such as force, torque, pressure, stress, a position, displacement, a speed, acceleration, an angle, an angular velocity, a quantity of rotations, a rotational speed, and a time at which a working status changes; and convert the physical quantity into power to perform detection and control. Other sensing components may further include a gravity sensor, a tri-axis accelerometer, a gyroscope, and the like.

The processor unit 502 is a control center of the roaming network access apparatus 500, and is connected, by using various interfaces and lines, to various parts of the entire roaming network access apparatus 500; runs or executes a software program and/or module stored in the storage unit 505, and invokes data stored in the storage unit 505, so as to execute various functions of the roaming network access apparatus 500 and/or process data. The processor unit 502 may include an integrated circuit (Integrated Circuit, IC for short), for example, may include a single packaged IC, or may include multiple packaged ICs with a same function or different functions. For example, the processor unit 502 may include only a central processing unit (Central Processing Unit, CPU for short), or may be a combination of a GPU, a digital signal processor (Digital Signal Processor, DSP for short), and a control chip (for example, a baseband chip) in the communications unit 504. In this embodiment of the present invention, the CPU may be a single computing core, or may include multiple computing cores.

The communications unit 504 is specifically configured to communicate between the roaming network access apparatus 500 and another device; a data packet may be received or transmitted by using the communications unit 504. The communications unit 504 may include communication modules, such as a wireless local area network (Wireless Local Area Network, wireless LAN for short) module, a Bluetooth module, and a baseband (Base Band) module, and a radio frequency (Radio Frequency, RF for short) circuit corresponding to the communication module, where the RF circuit is configured to perform wireless local area network communication, Bluetooth communication, infrared communication and/or cellular communications system communication, such as wideband code division multiple access (Wideband Code Division Multiple Access, W-CDMA for short) and/or high speed download packet access (High Speed Downlink Packet Access, HSDPA for short). The communication module is configured to control communication between components in the roaming network access apparatus 500, and may support direct memory access (Direct Memory Access).

In different implementation manners of the present invention, each communication module in the communications unit 504 generally appears in a form of an integrated circuit chip (Integrated Circuit Chip), and may be combined selectively without a need of including all communication modules and corresponding antenna groups. For example, the communications unit 504 may include only a baseband chip, a radio frequency chip, and a corresponding antenna, so as to provide a communication function in a cellular communications system. The roaming network access apparatus 500 can be connected to a cellular network (Cellular Network) or the Internet (Internet) through a wireless communication connection established by the communications unit 504, such as a wireless local area network access or a WCDMA access. In some optional implementation manners of the present invention, a communication module, for example, the baseband module, of the communications unit 504 may be integrated into the processor unit 502, typically, such as an APQ+MDM series platform provided by the Qualcomm (Qualcomm) company.

Specifically, in this embodiment of the present invention, the communications unit 504 searches for at least one available network in a roaming area. Optionally, the communications unit 504 is further configured to acquire historical roaming information from a network server; where the historical roaming information is used to record information about a network to which a registration attempt has been made when the user roams.

The output unit 503 includes but is not limited to an image output unit and a voice output unit. The image output unit is configured to output text, a picture, and/or a video. The image output unit may include a display panel, for example, a display panel configured in a form of an LCD (Liquid Crystal Display, liquid crystal display), an OLED (Organic Light-Emitting Diode, organic light-emitting diode), a field emission display (field emission display, FED for short), and the like; or the image output unit may include a reflective display, for example, an electrophoretic (electrophoretic) display or a display using an interferometric modulation of light (Interferometric Modulation of Light) technology. The image output unit may include a single display or multiple displays of different sizes. In a specific implementation manner of the present invention, the touch control panel used by the foregoing input unit 501 may also be used as the display panel of the output unit 503. For example, after detecting a touching or approaching gesture operation on the touch control panel, the touch control panel transmits the gesture operation to the processor unit 502, so as to determine a type of a touch event, and then the processor unit 502 provides corresponding visual output on the display panel according to the type of the touch event. Apparently, in FIG. 5, although the input unit 501 and the output unit 503 are used as two independent parts to implement input and output functions of the roaming network access apparatus 500, in some embodiments, the touch panel and the display panel may be integrated to implement the input and output functions of the roaming network access apparatus 500. For example, the image output unit may display various graphical user interfaces (Graphical User Interface, GUI for short), so as to use the graphical user interfaces as virtual control components, and the graphical user interfaces include but are not limited to a window, a scrollbar, an icon, and a clipboard, so that a user operates in a touching manner.

In a specific implementation manner of the present invention, the image output unit includes a filter and an amplifier that are configured to filter and amplify a video output by the processor unit 502. An audio output unit includes an analog-to-digital converter, configured to convert an audio signal output by the processor unit 502 from a digital format into an analog format.

The storage unit 505 may be configured to store a software program and a module, and the processor unit 502 runs the software program and the module stored in the storage unit 505 to execute various function applications of the roaming network access apparatus 500 and implement data processing. The storage unit 505 mainly includes a program storage area and a data storage area, where the program storage area may store an operating system, and an application program required by at least one function, such as a sound play program or an image play program; and the data storage area may store data (such as audio data or a phone book) that is created according to use of the roaming network access apparatus 500, and the like. In a specific implementation manner of the present invention, the storage unit 505 may include a volatile memory, such as a non-volatile dynamic random access memory (Non-volatile Random Access Memory, NVRAM for short), a phase change random access memory (Phase Change RAM, PRAM for short), or a magetoresistive random access memory (Magetoresistive RAM, MRAM for short), and may further include a non-volatile memory, such as at least one magnetic disk storage device, an electrically erasable programmable read-only memory (Electrically Erasable Programmable Read-Only Memory, EEPROM for short), or a flash memory device, for example, an NOR flash memory (NOR flash memory) or an NAND flash memory (NAND flash memory). The non-volatile memory stores an operating system and an application program that are executed by the processor unit 502. The processor unit 502 loads, from the non-volatile memory, a running program and data to a memory, and stores digital content in a mass storage apparatus. The operating system includes various components and/or drivers that are configured to control and manage regular system tasks, such as memory management, control of a storage device, and power management, and facilitate communications between various software and hardware. In this embodiment of the present invention, the operating system may be an Android system of the Google company, an iOS system developed by the Apple company, a Windows operating system developed by the Microsoft company, or the like; or an embedded operating system, such as Vxworks.

The application program includes any application installed on the roaming network access apparatus 500, and includes but is not limited to a browser, an email, an instant messaging service, text processing, a virtual keyboard, a window widget (Widget), encryption, digital copyright management, voice recognition, voice duplication, positioning (such as a function provided by the Global Positioning System), music playback, and the like.

Specifically, in this embodiment of the present invention, optionally, the storage unit 505 may store historical roaming information, where the historical roaming information is used to record information about a network to which a registration attempt has been made when the user roams. The storage unit 505 stores program data, and the processor unit 502 executes the program data, so as to adjust, according to the historical roaming information stored in the storage unit 505 or the historical roaming information acquired by the communications unit 504, a priority of an available network found by the communications unit 504. The communications unit is further configured to successively select, in descending order of a priority that is of the at least one found available network and is adjusted by the foregoing processor unit 502, the at least one found available network as a registration attempt network, and attempt to register with the registration attempt network.

Further, the historical roaming information stored in the storage unit 505 includes a first roaming network list, or the historical roaming information acquired by the communications unit 504 includes a first roaming network list, where the first roaming network list is used to record information about a successfully registered network when the user roams. The processor unit 502 executes the program data stored in the storage unit 505, so as to: determine whether the available network found by the communications unit 504 is recorded in the first roaming network list; if the available network found by the communications unit 504 is recorded in the first roaming network list, retain or increase the priority of the at least one found available network.

Optionally, the historical roaming information stored in the storage unit 505 includes a second roaming network list, or the historical roaming information acquired by the communications unit 504 includes a second roaming network list, where the second roaming network list is used to record information about an unsuccessfully registered network when the user roams. The processor unit 502 executes the program data stored in the storage unit 505, so as to: set a priority of a network that is in the available network found by the communications unit 504 and is recorded in the second roaming network list to be lower than a priority of a network not recorded in the second roaming network list.

The power supply 507 is configured to supply power to different parts of the roaming network access apparatus 500 to maintain running of the different parts. Generally, the power supply may be a built-in battery, such as a common lithium-ion battery or a nickel-hydride battery; and may also include an external power supply that directly supplies power to the roaming network access apparatus 500, such as an AC adapter. In some implementation manners of the present invention, the power supply 507 may further have a broader definition. For example, the power supply 507 may further include a power management system, a charging system, a power fault detection circuit, a power converter or an inverter, a power status indicator (such as a light emitting diode), and any other component that is associated with power generation, management, and distribution of the roaming network access apparatus 500.

It should be noted that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In the foregoing embodiments, the description of each embodiment has respective focuses. For a part that is not described in detail in an embodiment, reference may be made to related descriptions in other embodiments. In addition, relational terms such as "first" and "second" are merely used to distinguish one entity from another, and do not necessarily require or imply that any actual relationship or sequence exists between these entities.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that: the above each embodiment is distinguished only for describing technical solutions of the present invention, and technical solutions provided in each embodiment may be mutually referenced or combined. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A roaming network access method, comprising:
searching, by user equipment, for at least one available network in a roaming area;
acquiring, by the user equipment, historical roaming information, wherein the historical roaming information is information about a network to which a registration attempt has been made when the user equipment roams;
adjusting, by the user equipment, a priority of the at least one found available network according to the historical roaming information; and
successively selecting, by the user equipment in descending order of an adjusted priority of the at least one found available network, the at least one found available network as a registration attempt network, and attempting to register with the registration attempt network;
wherein the historical roaming information comprises: a first roaming network list used to record information about a successfully registered network when the user equipment roams; and
wherein adjusting, by the user equipment, a priority of the at least one found available network according to the historical roaming information comprises:
determining, by the user equipment, whether the at least one found available network is recorded in the first roaming network list; and if the at least one found available network is recorded in the first roaming network list, retaining or increasing the priority of the at least one found available network; and
wherein after attempting to register with the registration attempt network, the method further comprises:
determining, by the user equipment, whether the registration is successful; and
if it is determined that the user equipment is not successfully registered with the registration attempt network, determining, by the user equipment, whether the registration attempt network is recorded in the first roaming network list, and when it is determined that the registration attempt network is recorded in the first roaming network list, deleting a record of the registration attempt network from the first roaming network list; or
if it is determined that the user equipment is successfully registered with the registration attempt network, determining, by the user equipment, whether the registration attempt network is recorded in the first roaming network list, and when it is determined that the registration attempt network is not recorded in the first roaming network list, adding a record of the registration attempt network to the first roaming network list.

2. A roaming network access method, comprising:
searching, by user equipment, for at least one available network in a roaming area;
acquiring, by the user equipment, historical roaming information, wherein the historical roaming information is information about a network to which a registration attempt has been made when the user equipment roams;
adjusting, by the user equipment, a priority of the at least one found available network according to the historical roaming information; and
successively selecting, by the user equipment in descending order of an adjusted priority of the at least one found available network, the at least one found available network as a registration attempt network, and attempting to register with the registration attempt network;
wherein the historical roaming information comprises: a second roaming network list used to record information about an unsuccessfully registered network when the user equipment roams; and
wherein adjusting, by the user equipment, a priority of the at least one found available network according to the historical roaming information comprises:
setting, by the user equipment, a priority of a network that is in the at least one found available network and is recorded in the second roaming network list to be lower than a priority of a network not recorded in the second roaming network list; and
wherein after attempting to register with the registration attempt network, the method further comprises:
determining, by the user equipment, whether the registration is successful; and
if it is determined that the user equipment is not successfully registered with the registration attempt network, determining, by the user equipment, whether the registration attempt network is recorded in the second roaming network list, and when it is determined that the registration attempt network is not recorded in the second roaming network list, adding a record of the registration attempt network to the second roaming network list; or
if it is determined that the user equipment is successfully registered with the registration attempt network, determining, by the user equipment, whether the registration attempt network is recorded in the second roaming network list, and when it is determined that the registration attempt network is recorded in the second roaming network list, deleting a record of the registration attempt network from the second roaming network list.

3. The method according to claim 1, further comprising:
storing the historical roaming information in a non-volatile memory of the user equipment.

4. The method according to claim 3, wherein:
a backup of the historical roaming information is stored in a cloud; and
acquiring, by the user equipment, historical roaming information comprises:
detecting, by the user equipment, whether the historical roaming information is stored in the non-volatile memory of the user equipment,
if the historical roaming information is not stored in the non-volatile memory of the user equipment, acquiring, by the user equipment, the historical roaming information stored in the cloud, or
if the historical roaming information is stored in the non-volatile memory of the user equipment, synchronizing, by the user equipment, the historical roaming information to the cloud.

5. The method according to claim 4, further comprising:
after the historical roaming information is updated, synchronizing, by the user equipment, the historical roaming information to the cloud.

6. The method according to claim 1, further comprising:
storing the historical roaming information in a subscriber identity module.

7. The method according to claim 6, further comprising:
storing the historical roaming information in a historical roaming information elementary file (EF) in the subscriber identity module.

8. The method according to claim 7, wherein:
the historical roaming information EF comprises a valid time; and
the method further comprises: when the valid time expires, deleting the historical roaming information from the historical roaming information EF.

9. A roaming network access apparatus, comprising:
a storage device, configured to store program data;
a processor, configured to execute the program data to:
search for at least one available network in a roaming area,
acquire historical roaming information, wherein the historical roaming information is information about a network to which a registration attempt has been made when the apparatus roams, and
adjust, according to the historical roaming information acquired by the acquiring module, a priority of the available network found by the searching module; and
a communications unit, configured to successively select, in descending order of a priority that is of the at least one found available network and is adjusted by the adjusting module, the at least one found available network as a registration attempt network, and attempt to register with the registration attempt network;
wherein the historical roaming information comprises: a first roaming network list used to record information about a successfully registered network when the apparatus roams; and
the processor is further configured to determine whether the at least one found available network is recorded in the first roaming network list; and if the at least one found available network is recorded in the first roaming network list, retain or increase the priority of the at least one found available network; and
wherein the processor is further configured to:
after the attempt to register with the registration attempt network is made by the communications unit, determine whether the registration is successful; and
if it is determined that the apparatus is not successfully registered with the registration attempt network, determine whether the registration attempt network is recorded in the first roaming network list, and when it is determined that the registration attempt network is recorded in the first roaming network list, delete a record of the registration attempt network from the first roaming network list; or
if it is determined that the apparatus is successfully registered with the registration attempt network, determine whether the registration attempt network is recorded in the first roaming network list, and when it is determined that the registration attempt network is not recorded in the first roaming network list, add a record of the registration attempt network to the first roaming network list.

10. A roaming network access apparatus, comprising:
a storage device, configured to store program data;
a processor, configured to execute the program data to:
search for at least one available network in a roaming area,
acquire historical roaming information, wherein the historical roaming information is information about a network to which a registration attempt has been made when the apparatus roams, and
adjust, according to the historical roaming information acquired by the acquiring module, a priority of the available network found by the searching module; and
a communications unit, configured to successively select, in descending order of a priority that is of the at least one found available network and is adjusted by the adjusting module, the at least one found available network as a registration attempt network, and attempt to register with the registration attempt network;
wherein the historical roaming information comprises: a second roaming network list used to record information about an unsuccessfully registered network when the apparatus roams; and
the processor is further configured to set a priority of a network that is in the at least one found available network and is recorded in the second roaming network list to be lower than a priority of a network not recorded in the second roaming network list; and
wherein the processor is further configured to:
after the attempt to register with the registration attempt network is made by the communications unit, determine whether the registration is successful; and
if it is determined that the apparatus is not successfully registered with the registration attempt network, determine whether the registration attempt network is recorded in the second roaming network list, and when it is determined that the registration attempt network is not recorded in the second roaming network list, add a record of the registration attempt network to the second roaming network list; or
if it is determined that the apparatus is successfully registered with the registration attempt network, determine whether the registration attempt network is recorded in the second roaming network list, and when it is determined that the registration attempt network is recorded in the second roaming network list, delete a record of the registration attempt network from the second roaming network list.

11. The apparatus according to claim 9, wherein the historical roaming information is stored in a non-volatile memory of the apparatus.

12. The apparatus according to claim 11, wherein:
a backup of the historical roaming information is stored in a cloud; and
the processor is further configured to:
detect whether the historical roaming information is stored in the non-volatile memory of the apparatus, and
if the historical roaming information is not stored in the non-volatile memory of the apparatus, acquire the historical roaming information stored in the cloud, or
if the historical roaming information is stored in the non-volatile memory of the apparatus, synchronize the historical roaming information to the cloud.

13. The apparatus according to claim 12, wherein the processor is further configured to:
after the historical roaming information is updated, synchronize the historical roaming information to the cloud.

14. The apparatus according to claim 9 wherein the apparatus is capable of being inserted with a subscriber identity module or comprises a subscriber identity module, and the historical roaming information is stored in the subscriber identity module.

15. The method according to claim 2, further comprising:
storing the historical roaming information in a non-volatile memory of the user equipment.

16. The method according to claim 15, wherein:
a backup of the historical roaming information is stored in a cloud; and
acquiring, by the user equipment, historical roaming information comprises:
   detecting, by the user equipment, whether the historical roaming information is stored in the non-volatile memory of the user equipment,
   if the historical roaming information is not stored in the non-volatile memory of the user equipment, acquiring, by the user equipment, the historical roaming information stored in the cloud, or
   if the historical roaming information is stored in the non-volatile memory of the user equipment, synchronizing, by the user equipment, the historical roaming information to the cloud.

17. The method according to claim 16, further comprising:
after the historical roaming information is updated, synchronizing, by the user equipment, the historical roaming information to the cloud.

18. The method according to claim 2, further comprising:
storing the historical roaming information in a subscriber identity module.

19. The method according to claim 18, further comprising:
storing the historical roaming information in a historical roaming information elementary file (EF) in the subscriber identity module.

20. The method according to claim 19, wherein:
the historical roaming information EF comprises a valid time; and
the method further comprises: when the valid time expires, deleting the historical roaming information from the historical roaming information EF.

21. The apparatus according to claim 10, wherein the historical roaming information is stored in a non-volatile memory of the apparatus.

22. The apparatus according to claim 21, wherein:
a backup of the historical roaming information is stored in a cloud; and
the processor is further configured to:
   detect whether the historical roaming information is stored in the non-volatile memory of the apparatus, and
   if the historical roaming information is not stored in the non-volatile memory of the apparatus, acquire the historical roaming information stored in the cloud, or
   if the historical roaming information is stored in the non-volatile memory of the apparatus, synchronize the historical roaming information to the cloud.

23. The apparatus according to claim 22, wherein the processor is further configured to:
after the historical roaming information is updated, synchronize the historical roaming information to the cloud.

24. The apparatus according to claim 10 wherein the apparatus is capable of being inserted with a subscriber identity module or comprises a subscriber identity module, and the historical roaming information is stored in the subscriber identity module.

* * * * *